Aug. 6, 1940.   H. M. LEAKE   2,210,086
SEED DISTRIBUTOR FOR SEED DRILLS
Filed Jan. 22, 1938
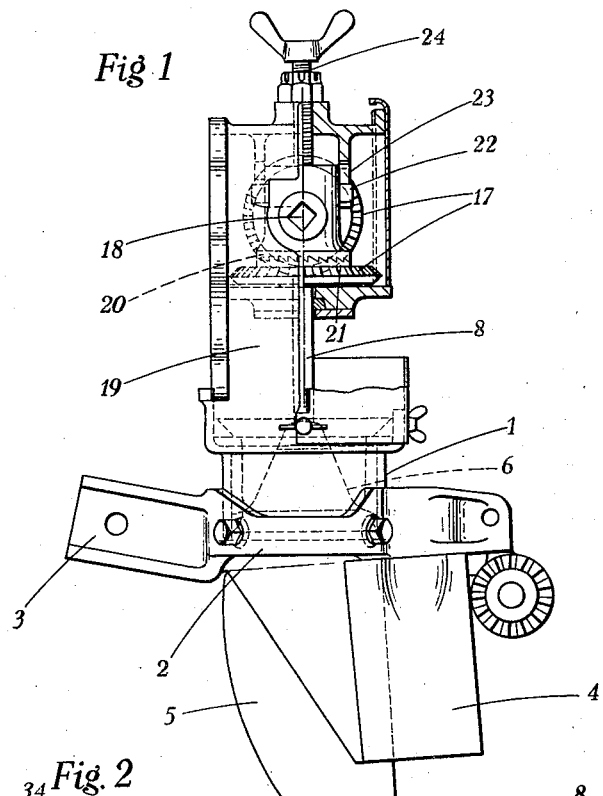
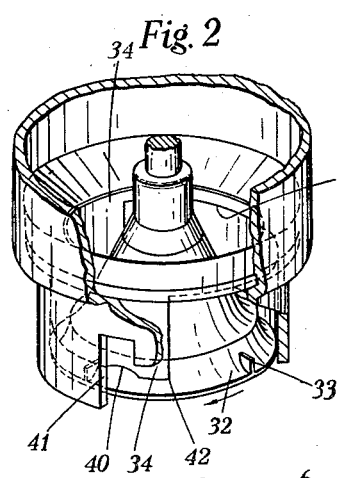
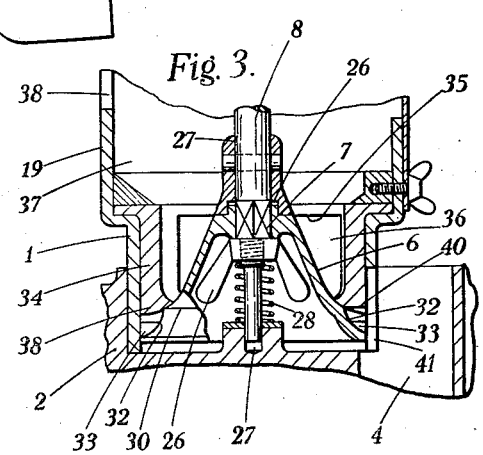
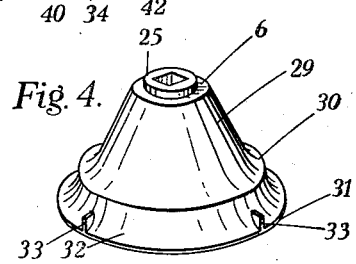
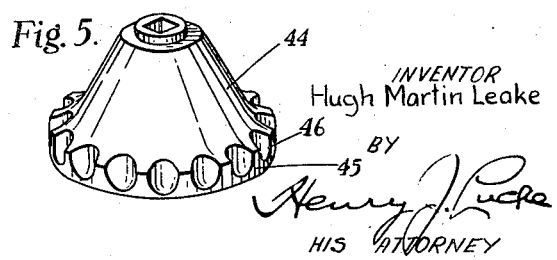
INVENTOR
Hugh Martin Leake
BY
Henry J. Pucke
HIS ATTORNEY Patented Aug. 6, 1940

2,210,086

UNITED STATES PATENT OFFICE 2,210,086

SEED DISTRIBUTOR FOR SEED DRILLS

Hugh Martin Leake, Cambridge, England

Application January 22, 1938, Serial No. 186,313
In Great Britain February 8, 1937

1 Claim. (Cl. 221—130)

distributor members as described above. A suitable height for the fins is half the depth of the groove in the rotary distributor member, but some variations in this relationship are permissible.

The new rotary distributor is in no sense a pocketed one—the gaps in the groove between the said fins do not act as pockets in the sense of the pockets of the rotary distributor in the seed drill described in my said previous patent, but the fins although partially dividing the groove into two or more parts simply serve to keep the seed moving in unison with the rotary distributor and do not interfere with the continuity of the sowing.

Thus by replacing the pocketed rotary distributor of the spacing drill by a rotary distributor according to this invention the spacing drill can rapidly and easily be converted to a continuous sowing drill, whereby my object of producing a simple and efficient drill capable of operating in both ways is fulfilled without involving any appreciable additional cost in the drill or the performance by the farmer of difficult feats of conversion.

Although the baffle member would be the same as that employed with the pocketed distributor it would not at any time shut off any one part of the said continuous groove in the rotary groove continuous sowing distributor from any other part thereof and would serve, when the grooved distributor was employed, only for levelling off the seed in the groove as the seed approached the discharge aperture in the casing.

It will be appreciated that the baffle, the combined reciprocation and rotation of the rotary distributor, and the particular form of the latter all contribute in combination to the success of the drill in effecting the eminently satisfactory continuous sowing results attained thereby.

Although the rotary distributor is preferably of the approximate bell shape described in my said prior patent, its form could be other than this. For instance, it could be of disc form and have the said groove in its perimeter, and a cone or bell shaped part could be disposed above the disc so as to direct seed to the edge of the disc.

In order that my invention may be clearly understood and readily carried into practice, I have appended hereto one sheet of drawings wherein:

Figure 1 is a side elevation partly in section of one form of distributor constructed in accordance with this invention, Figure 2 is a perspective view partly in section of the middle portion of the distributor shown in Figure 1, Figure 3 is a vertical cross section of the middle portion of the apparatus shown in Figure 1, the section being taken in the plane of the drawing, Figure 4 is a perspective view of the rotary distributor member shown in the apparatus illustrated in Figures 1 to 3, Figure 5 is a perspective view of a pocketed distributor member adapted to replace that shown in Figure 4 when the machine is to be converted into a spacing machine.

Referring to Figures 1 to 4 of the drawing:

1 is the distributor box which is internally cylindrical and has its axis, when the distributor is in use, substantially vertical. The distributor box 1 is closed at the lower side by a cover or cap 2 with which is integrally formed a radial and upwardly extending arm 3 adapted to be connected to a rod for pivotal association with the frame of the seed drill, this rod and the means for raising and lowering it being of any suitable kind and preferably such as is described in my prior Patent No. 1,979,948.

A short coulter tube 4 is also carried by the cap or cover member 2 and extends downwardly from the lower side thereof, and in front of this coulter tube 4 is provided a share 5.

The hollow cone or bell-like distributor 6 is rotatably and co-axially mounted in the distributor box 1. In its upper end the distributor has an aperture of square cross section to receive a squared portion 7 of a vertical spindle 8 driven by bevel gearing 17 from a horizontal shaft 18 deriving its power from any suitable source, for example, from the ground wheels of the drill.

The gearing 17 and shaft 18 are supported in framework 19 carried by the upper part of the distributor box 1.

The shaft 8 of the distributor is, with the distributor itself, vibratable axially, this vibration being effected by means of a rotationally stationary annular toothed member 20 and a toothed wheel 21 fixed on the shaft 8.

The member 20 has a pair of laterally extending pins engaging in slots 23 in a hollow cylinder integral with the frame 19, and these pins 22 prevent the toothed member 20 rotating about its own axis but the member 20 can be slidden up and down by means of the screw 24 so as to vary the axial vibrating movement of the shaft 8 or to enable the vibration to be discontinued altogether if desired.

The distributor 6 has at its upper end a positioning boss 25 adapted to engage in a recess 26 in the under side of a stop collar 27 secured in the spindle 8, and the distributor is retained on the square part 7 of the shaft 8 by a wing nut 26 housed entirely within the distributor member 1, but readily accessible to a person wishing to remove it, immediately the cap or cover 2 has been removed from the distributor box 1.

The lower end of the spindle 8 is reduced in diameter and is positioned against lateral movement in a footbearing 27 provided in the upper surface of the cap 2, and between the latter and the wing nut 26 is provided a helically coiled spring 28 which tends to press the spindle 8 upwardly.

The distributor 6 has an upper portion 29 of substantially frusto-conical form which gradually curves outwardly and downwardly to the line 30. Below the line 30 the distributor has a rim the lower edge 31 of which is cylindrical but of very short axial length. Between the line 30 and the part 31, the distributor is provided with a peripheral continuous groove 32, the radial cross section of which is, as shown in Figure 3, of concave form, the wall of the groove sloping in a curvilinear path downwardly and outwardly towards the periphery of the distributor. The groove is thus closed at the bottom but is open at the top and at the peripheral edge of the distributor member, although this peripheral edge of the groove is in fact closed by the inner surface of the distributor box 1.

At widely spaced intervals around the distributor are provided fins 33. These fins are preferably formed integrally with the distributor member and project upwardly vertically from the bottom of the groove 32. The height of the fins 33 is, as shown preferably substantially half the full depth of the groove 32, that is half the vertical height between the plane containing the line 30 (Fig. 4) and the plane containing the bottom edge of the distributor.

The circumferential thickness of the fins 33 is very small and preferably does not exceed 1/10 of the circumferential length of the cylindrical part 31 of the distributor member.

Within the distributor box 1 is arranged a stationary baffle member 34 which is in the form of a hollow cylinder having a gap 35. This baffle is externally a close fit in the distributor box 1 and is of such an internal diameter as to leave between the distributor 6 and the baffle, a space 36 for the reception of seed.

This space 36 communicates with a chamber 37 within the upper frame 19, and this chamber 37 communicates by way of an aperture 38 with any suitable seed hopper, either directly or by means of a flexible tube or the like.

The baffle is non-rotatable in the distributor box and at its lower edge is provided with a radial recess 40 which registers with a discharge aperture 41 provided in the wall of the distributor box 1. As will be seen from the drawing, the baffle 34 shields the aperture 41 from all seed within the distributor box except that in the groove 32 of the distributor 6 and being brought by the latter round to the aperture 41. Moreover, the corner 42 of the baffle serves to level off the seed in the groove 32 and so regulates the quantity of seed that can flow out of the aperture 41.

It will be seen also that the fins 33 on the distributor 6 are of such a height as to leave a clear space between the bottom edge surface of the baffle 34 and the tops of the fins, so that there is no possibility of seed being crushed between the fins and the baffle.

The lower edge of the baffle 34 is thickened at 38 as is clearly seen in the sectional view of Fig. 3, and the thickened part of the baffle has its lower surface curved closely to follow the outer curved surface of the rotary distributor 6. All this is clearly seen from Figure 3. The thickened part 38 of the baffle also extends up the surface of the distributor 6 above the line 30 so that it is impossible for seed to pass from the seed space 36 into the groove 32 of the distributor except at places between the ends of the gas 35 in the baffle, hence the discharge of seed through the aperture 41 in the distributor box is regulated solely by the groove 32 in the distributor and the baffle 34, and as the distributor rotates continuously, seed is fed out of the aperture 41 in a continuous stream, the continuity of this stream being uninterrupted by the fins 33 which are very thin in relation to the circumferential length of the distributor groove 32, and which fins do not entirely break the ring of seed in the groove 32.

The downwardly and outwardly curving form of the groove 32 together with the axial vibration of the distributor 6 ensure that seed will be somewhat compacted in the groove 32 and will, when it comes opposite the discharge aperture 41 flow downwardly and outwardly through this aperture.

By arranging the aperture 41 at the top of the coulter tube 4 and by making the latter very short so that the distributor box is close to the ground when the drill is in use, there is no likelihood of spreading of the seed during its fall down the coulter tube, because the time of fall is so very short, and thus regularity in sowing is obtained.

Figure 5 shows a rotary distributor 44 which is provided in its rim 45 with a series of pockets 46. These pockets are completely isolated from one another, and when a series of pockets are in the position under the baffle 34, the seed in any one pocket is completely isolated from the seed in the adjacent pockets and from the seed in the seed space 36.

The rotary distributor 44 is otherwise somewhat similar to that shown in Figure 4, being adapted to replace the latter when it is intended to convert the seed drill from one which sows a continuous stream to one which sows seed at distinctly spaced intervals.

No claim is made in this application per se to the pocketed distributor as a similar distributor is described in my said prior patent, but it will be appreciated that by having two distributors of the form shown in Figures 4 and 5 respectively, the seed distributor becomes applicable both for spaced and continuous sowing at will merely by a simple interchanging of the distributors.

A very large range of operation can be followed with a machine constructed in accordance with this invention, especially if it includes four rotary distributors which are interchangeable one with the other, two of these distributors having pockets as that shown in Figure 5, but the pockets in one being larger than the pockets in the other, so that one distributor could be used for sowing, say, beet, mangolds and cereals, whilst the other would be used for sowing, for example, mustard, rape and turnip. The other two of the four distributors would be constructed as shown in Figure 4, but of the two one would have a deeper groove than the other, so that the one with the larger groove could be used in sowing beets, mangolds and cereals in a continuous stream, whilst the other could be used for sowing mustard, rape and turnip in continuous streams.

What I claim is:

A seed drill for sowing seed in a continuous stream and comprising a distributor box to which seed may be supplied and having a discharge aperture in its peripheral wall, a rotary seed distributor within said distributor box and having a cylindrical rim which is a close but rotatable fit in the distributor box, the distributor decreasing in cross sectional area upwardly from said rim and the latter having a continuous peripheral groove open at the upper and outer sides thereof but closed at the bottom, a plurality of upstanding fins projecting from the bottom of said groove at considerably spaced intervals and of a height approximately one-half the depth of the latter, said fins also being thin in a circumferential direction and extending fully from the wall of said groove to the periphery of the said rim, means for rotating said distributor, means for vibrating it along its axis of rotation, and baffle means in said distributor box isolating the discharge aperture of the box from the interior of the latter except by way of said groove in the rim of the distributor.

HUGH MARTIN LEAKE.